United States Patent
Katterbauer et al.

(10) Patent No.: US 12,404,763 B2
(45) Date of Patent: Sep. 2, 2025

(54) WIRELESS HYDROGEN SUBSURFACE SENSING FRAMEWORK FOR RESERVOIR OPTIMIZATION

(71) Applicant: SAUDI ARABIAN OIL COMPANY, Dhahran (SA)

(72) Inventors: Klemens Katterbauer, Dhahran (SA); Abdallah Al Shehri, Dhahran (SA); Abdulaziz S. Al-Qasim, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 487 days.

(21) Appl. No.: 17/817,910

(22) Filed: Aug. 5, 2022

(65) Prior Publication Data
US 2024/0044242 A1    Feb. 8, 2024

(51) Int. Cl.
E21B 47/00 (2012.01)
E21B 43/243 (2006.01)

(52) U.S. Cl.
CPC ............ E21B 47/00 (2013.01); E21B 43/243 (2013.01); *E21B 2200/22* (2020.05)

(58) Field of Classification Search
CPC ..... E21B 47/00; E21B 43/243; E21B 2200/22
See application file for complete search history.

(56) References Cited

U.S. PATENT DOCUMENTS

| | | | |
|---|---|---|---|
| 8,434,354 B2 * | 5/2013 | Crow | E21B 41/0064 73/152.16 |
| 10,107,495 B2 * | 10/2018 | Minto | F23N 1/00 |
| 2009/0260824 A1 * | 10/2009 | Burns | E21B 36/04 166/57 |
| 2012/0098674 A1 * | 4/2012 | McStay | G01V 3/15 340/850 |
| 2018/0284758 A1 * | 10/2018 | Cella | H04L 1/18 |
| 2020/0157922 A1 * | 5/2020 | Stout | E21B 47/13 |
| 2020/0394813 A1 * | 12/2020 | Theverapperuma | G06F 18/2431 |
| 2021/0012190 A1 * | 1/2021 | Murali | G06Q 10/04 |
| 2021/0147787 A1 | 5/2021 | Sefton | |
| 2021/0225070 A1 * | 7/2021 | Al-Nasser | G01V 20/00 |

OTHER PUBLICATIONS

Rowaihy et al. A Survey of Sensor Selection Schemes in Wireless Sensor Networks, Proceedings of SPIE, 2007 (Year: 2007).*

(Continued)

*Primary Examiner* — Lisa M Caputo
*Assistant Examiner* — Sharah Zaab
(74) *Attorney, Agent, or Firm* — Osha Bergman Watanabe & Burton LLP

(57) ABSTRACT

A method for optimizing a wireless sensor network for monitoring hydrogen production from fire flooding involves training a machine learning model to generate an estimate of communication performance of each of a multitude of sensors. The sensors are a component of the wireless sensor network disposed in a sub-surface hydrogen reservoir, with each of the multitude of sensors configured to obtain measurements of environmental variables of the hydrogen reservoir. The method further involves minimizing a cardinality of the multitude of sensors, using the machine learning model.

17 Claims, 5 Drawing Sheets

(56) References Cited

OTHER PUBLICATIONS

Alshehri, Abdallah A., et al., "FracBot Technology for Mapping Hydraulic Fractures", SPE 187196, Apr. 2021 SPE Journal, Society of Petroleum Engineers, Oct. 2017, pp. 610-626 (17 pages).
Katterbauer, Klemens, et al., "A Data Driven Artificial Intelligence Framework for Hydrogen Production Optimization in Waterflooded Hydrocarbon Reservoir", SPE-207847-MS, Society of Petroleum Engineers, Nov. 2021, pp. 1-9 (9 pages).
Lee, Jaewon, et al., "Machine learning-based energy optimization for on-site SMR hydrogen production", Energy Conversion and Management, ScienceDirect, Elsevier Ltd., vol. 244, No. 114438, 2021 (13 pages).
Jacobs, Trent, "Canadian Operator Works to Transform an Oil Field Into a Hydrogen Factory", Journal of Petroleum Technology, Mar. 1, 2021, URL: <https://jpt.spe.org/canadian-operator-works-to-transform-an-oil-field-into-a-hydrogen-factory#:~:text=Founded%20in%202015%2C%20the%20young,bid%20to%20produce%20exclusively%20hydrogen.> (12 pages).
Hajdo, L.E., et al., "Hydrogen Generation During In-Situ Combustion", SPE 13661, Society of Petroleum Engineers, Mar. 1985, pp. 675-689 (15 pages).
Gonzalez, Luis E., et al., "Real Time Optimization of SAGD Wells", SPE 157923, Society of Petroleum Engineers, Jun. 2012, pp. 1-9 (9 pages).
Flecker, Michael J., et al., "Maximizing Reservoir Production Using New Technologies for Permanent Continuous Downhole Sensors", OTC 12153, Offshore Technology Conference, May 2000, pp. 1-9 (9 pages).
H. M. Luong et al.; "Sub-second and ppm-level optical sensing of hydrogen using templated control of nano-hydride geometry and composition", Nature Communications; vol. 12; No. 2414; Apr. 23, 2021; pp. 1-10 (10 pages).
Akhondi et al.; "Applications of Wireless Sensor Networks in the Oil, Gas and Resources Industries", 2010 24th IEEE International Conference on Advanced Information Networking and Applications; 2010; pp. 941-948 (8 pages).
T. W. MacDougall; "Large diamter waveguide Bragg grating components and their application in downhole oil & gas sensing", Proceedings of SPIE; vol. 5589; Dec. 14, 2004; pp. 221-232 (12 pages).
A. A. Alshehri et al.; "Wireless FracBot (Sensor) Nodes: Perfomance Evaluation of Inductively Coupled Near Field Communication", 2018 IEEE Sensors Applications Symposium (SAS); Mar. 2018 (6 pages).
K. Katterbauer et al., "A Novel Artificial Intelligence Framework for the Optimal Control of Wireless Temperature Sensors for Optimizing Oxygen Injection in Subsurface Reservoirs", Offshore Techonology Conference Asia, OTC-31558-MS, Mar. 18, 2022, pp. 1-10 (10 pages).
K. Katterbauer et al., "A Novel Deep Reinforcement Sensor Placement Method for Waterfront Tracking", Society of Petroleum Engineers, SPE-204851-MS, Dec. 15, 2021, pp. 1-8 (8 pages).
H. Rowaihy et al., "A Survey of Sensor Selection Schemes in Wireless Sensor Networks", Proceedings of SPIE, Apr. 27, 2007, vol. 6562 (13 pages).
H. Rashtian et al., "Using Deep Reinforcement Learning to Improve Sensor Selection in the Internet of Things", IEEE Access, vol. 8, May 13, 2020, pp. 95208-95222 (15 pages).
P. Nayak et al., "Energy Efficient Clustering Algorithm for Multi-Hop Wireless Sensor Network Using Type-2 Fuzzy Logic", IEEE Sensor Journal, Jul. 15, 2017, vol. 17, No. 14, pp. 4492-4499 (8 pages).
H. Messer et al., "A New Approach to Precipitation Monitoring: A critical survey of existing technologies and challenges", IEEE Signal Processing Magazine, May 1, 2015, vol. 32, No. 3, pp. 110-122 (13 pages).
A. A. Alshri et al., "Optimal energy planning for wirelss self-contained sensor networks in oil reservoirs", IEEE International Conference on Communications (ICC), May 21, 2017, pp. 1-7 (7 pages).
S. S. Mora et al., "Wireless Sensort Networks Optimization Using Machine Learning to Increase the Network Lifetime", Innovative Data Communication Technologies and Application, Jan. 1, 2020, pp. 319-329 (12 pages).
International Search Report and Written Opinion issued in International Application No. PCT/US2023/029345, mailed Mar. 11, 2023 (17 pages).

* cited by examiner

WIRELESS HYDROGEN SUBSURFACE SENSING FRAMEWORK FOR RESERVOIR OPTIMIZATION

BACKGROUND

Fireflood or in-situ combustion is a method involving an injection of air or oxygen into a well, followed by ignition. A burning zone propagates through the reservoir from one or more injection wells to one or more producing wells. The fireflood creates a bank of steam and/or gas from the combustion process and evaporated hydrocarbons, driving the reservoir oil into the producing wells. There are three types of fireflood processes: dry forward, dry reverse and wet forward combustion. In a dry forward process, air is injected and the combustion front moves from the injector to the producer. In a dry reverse process, the combustion front moves in the opposite direction. The wet forward injection is analogous to the dry forward injection, with air and water injected either simultaneously or alternatingly.

Subsurface reservoir sensing plays a crucial role in assessing the efficacy of the in-situ generation of hydrogen and maximizing hydrogen recovery from fire flooded hydrocarbon reservoirs, as well as minimizing carbon dioxide. A firm understanding of the in-situ reservoir conditions, such as temperature and gas content plays an essential role in optimizing the different types of subsurface fireflood processes for hydrogen recovery.

SUMMARY

In general, in one aspect, embodiments relate to a method for optimizing a wireless sensor network for monitoring hydrogen production from fire flooding, the method comprising: training a machine learning model to generate an estimate of communication performance of each of a plurality of sensors, wherein the sensors are a component of the wireless sensor network disposed in a sub-surface hydrogen reservoir, with each of the plurality of sensors configured to obtain measurements of environmental variables of the hydrogen reservoir; and minimizing a cardinality of the plurality of sensors, using the machine learning model.

In general, in one aspect, embodiments relate to a system for monitoring hydrogen production from fire flooding, the system comprising: a wireless sensor network disposed in sub-surface hydrogen reservoir, the sensor network comprising: a plurality of sensors configured to obtain measurements of environmental variables of the hydrogen reservoir; at least one base station configured to: wirelessly receive the measurements from the sensors; and forward the measurements to an aboveground gateway, a processing system configured to minimize a cardinality of the plurality of sensors using a machine learning model.

In general, in one aspect, embodiments relate to a non-transitory machine-readable medium comprising a plurality of machine-readable instructions executed by one or more processors, the plurality of machine-readable instructions causing the one or more processors to perform operations comprising: training a machine learning model to generate an estimate of communication performance of each of a plurality of sensors, wherein the sensors are a component of a wireless sensor network disposed in a sub-surface hydrogen reservoir, with each of the plurality of sensors configured to obtain measurements of environmental variables of the hydrogen reservoir; and minimizing a cardinality of the plurality of sensors, using the machine learning model.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for recovery of hydrogen from hydrocarbon reservoirs utilizing fire flooding. More specifically, embodiments disclosed herein relate to wireless hydrogen subsurface sensing for hydrogen reservoir optimization. In-situ reservoir sensing via wireless hydrogen sensors may be used in order to enhance recovery in fire flooded depleted hydrocarbon reservoirs such as depleted gas reservoirs, heavy oil reservoirs and ultra-sour reservoirs. Embodiments of the disclosure include wireless sensing equipment as well as an optimization framework for reliable and optimized wireless sensing. The main objective is to create sufficient heat, such that hydrogen and oxygen atoms can be split and retrieved from the water. The remaining hydrocarbons act as a fuel source for the process. A detailed description is subsequently provided.

Figure 1:
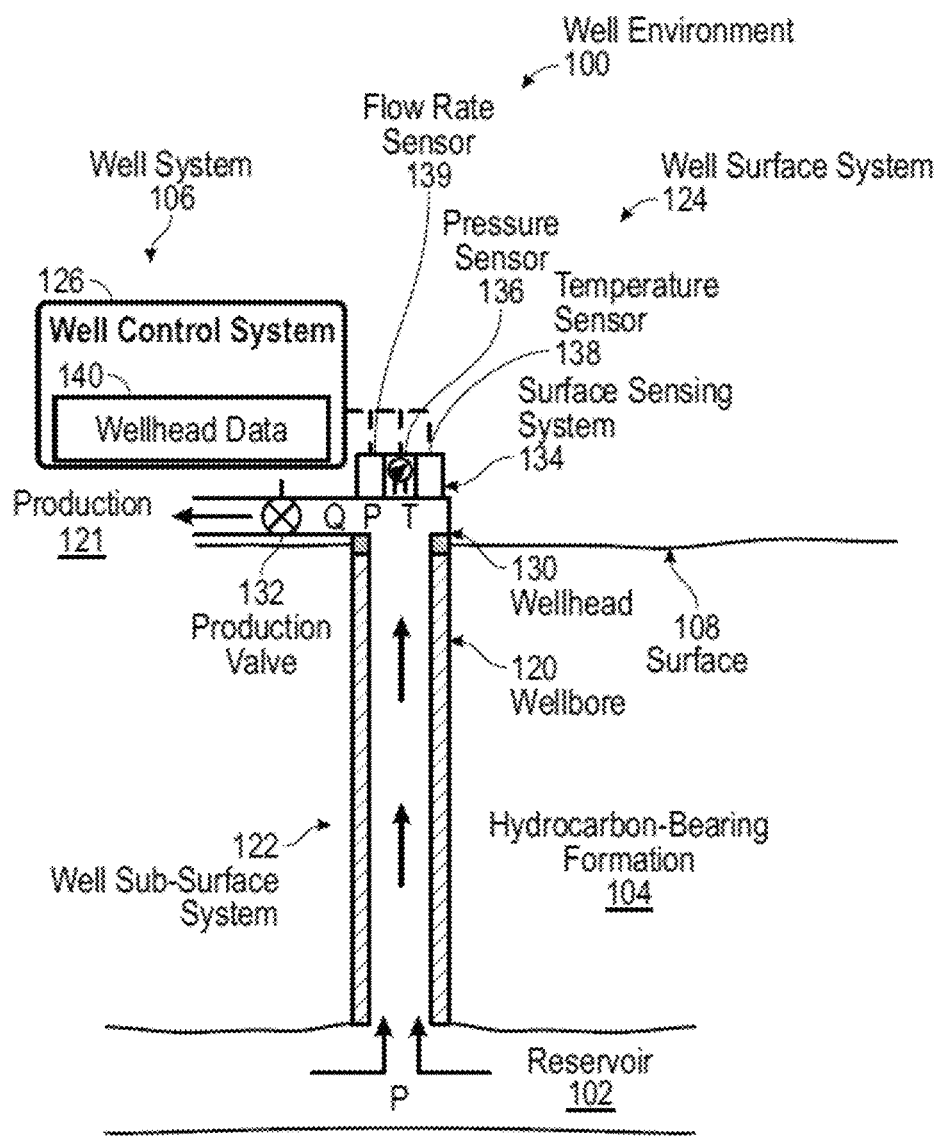
FIG. 1 shows a well environment in accordance with one or more embodiments.

Turning to FIG. 1, FIG. 1 shows a schematic diagram in accordance with one or more embodiments. FIG. 1 illustrates a well environment (100) that includes a hydrocarbon reservoir ("reservoir") (102) located in a subsurface hydrocarbon-bearing formation (104) and a well system (106). The hydrocarbon-bearing formation (104) may include a porous or fractured rock formation that resides underground, beneath the earth's surface ("surface") (108). In the case of the well system (106) being a hydrocarbon well, the reservoir (102) may include a portion of the hydrocarbon-bearing formation (104). The hydrocarbon-bearing formation (104) and the reservoir (102) may include different layers of rock having varying characteristics, such as varying degrees of permeability, porosity, and resistivity. In the case of the well system (106) being operated as a production well, the well system (106) may facilitate the extraction of hydrocarbons (or "production") from the reservoir (102). In the case of the well system (106) being operated as an injection well, the well system (106) may be used in a tertiary recovery method to displace the produced hydrocarbons and/or to maintain the pressure profile of the reservoir (102).

In some embodiments, the well system (106) includes a wellbore (120), a well sub-surface system (122), a well surface system (124), and a data acquisition system (126). The data acquisition system (126) may monitor and/or control various operations of the well system (106), such as well production operations, well completion operations, well maintenance operations, and reservoir monitoring, assessment and development operations. In some embodiments, the data acquisition system (126) includes a computer system that is the same as or similar to that of computer system (502) described below in FIG. 5 and the accompanying description.

The wellbore (120) may include a bored hole that extends from the surface (108) into a target zone of the hydrocarbon-bearing formation (104), such as the reservoir (102). An upper end of the wellbore (120), terminating at or near the surface (108), may be referred to as the "up-hole" end of the wellbore (120), and a lower end of the wellbore, terminating in the hydrocarbon-bearing formation (104), may be referred to as the "downhole" end of the wellbore (120). The wellbore (120) may facilitate the circulation of drilling fluids during drilling operations, the flow of hydrocarbon production ("production") (121) (e.g., oil and gas) from the reservoir (102) to the surface (108) during production operations, the injection of substances (e.g., water) into the hydrocarbon-bearing formation (104) or the reservoir (102) during injection operations, or the communication of monitoring devices (e.g., logging tools) into the hydrocarbon-bearing formation (104) or the reservoir (102) during monitoring operations (e.g., during in situ logging operations).

In some embodiments, during operation (production/injection) of the well system (106), the data acquisition system (126) collects and records wellhead data (140) for the well system (106) and other data regarding downhole equipment and downhole sensors. The wellhead data (140) may include, for example, a record of measurements of wellhead pressure (P) (e.g., including flowing wellhead pressure (FWHP)), wellhead temperature (T) (e.g., including flowing wellhead temperature), wellhead production rate (R) over some or all of the life of the well (106), and/or water cut data. In some embodiments, the measurements are recorded in real-time, and are available for review or use within seconds, minutes or hours of the condition being sensed (e.g., the measurements are available within 1 hour of the condition being sensed). In such an embodiment, the wellhead data (140) may be referred to as "real-time" wellhead data (140). Real-time wellhead data (140) may enable an operator of the well to assess a relatively current state of the well system (106), and make real-time decisions regarding development of the well system (106) and the reservoir (102), such as on-demand adjustments in regulation of production flow from the well or injection flow to the well.

In some embodiments, the well surface system (124) includes a wellhead (130). The wellhead (130) may include a rigid structure installed at the "up-hole" end of the wellbore (120), at or near where the wellbore (120) terminates at the Earth's surface (108). The wellhead (130) may include structures for supporting (or "hanging") casing and production tubing extending into the wellbore (120). Production (121) may flow through the wellhead (130), after exiting the wellbore (120) and the well sub-surface system (122), including, for example, the casing and the production tubing. In some embodiments, the well surface system (124) includes flow regulating devices that are operable to control the flow of substances into and out of the wellbore (120). For example, the well surface system (124) may include a production valve (132) that is operable to control the flow of production (121). For example, the production valve (132) may be fully opened to enable unrestricted flow of production (121) from the wellbore (120), the production valve (132) may be partially opened to partially restrict (or "throttle") the flow of production (121) from the wellbore (120), and the production valve (132) may be fully closed to fully restrict (or "block") the flow of production (121) from the wellbore (120), and through the well surface system (124).

Keeping with FIG. 1, in some embodiments, the well surface system (124) includes a surface sensing system (134). The surface sensing system (134) may include sensor devices for sensing characteristics of substances, including production (121), passing through or otherwise located in the well surface system (124). The characteristics may include, for example, pressure, temperature and flow rate of production (121) flowing through the wellhead (130), or other conduits of the well surface system (124), after exiting the wellbore (120).

In some embodiments, the surface sensing system (134) includes one or more surface pressure sensors (136) operable to sense the pressure of production (121) flowing through the well surface system (124), after it exits the wellbore (120). In some embodiments, the surface sensing system (134) includes a surface temperature sensor (138) operable to sense the temperature of production (151) flowing through the well surface system (124), after it exits the wellbore (120). The surface temperature sensor (138) may include, for example, a wellhead temperature sensor that senses a temperature of production (121) flowing through or otherwise located in the wellhead (130), referred to as "wellhead temperature" (T). In some embodiments, the surface sensing system (134) includes a flow rate sensor (139) operable to sense the flow rate of production (121) flowing through the well surface system (124), after it exits the wellbore (120).

Keeping with FIG. 1, when completing a well, one or more well completion operations may be performed prior to delivering the well to the party responsible for production or injection. Well completion operations may include casing operations, cementing operations, perforating the well, gravel packing, directional drilling, hydraulic stimulation of a reservoir region, and/or installing a production tree or wellhead assembly at the wellbore (120). Likewise, well operations may include open-hole completions or cased-hole completions. For example, an open-hole completion may refer to a well that is drilled to the top of the hydrocarbon reservoir. Thus, the well is cased at the top of the reservoir, and left open at the bottom of a wellbore. In contrast, cased-hole completions may include running casing into a reservoir region.

Some embodiments include perforation operations. More specifically, a perforation operation may include perforating casing and cement at different locations in the wellbore (120) to enable hydrocarbons to enter a well stream from the resulting holes. For example, some perforation operations include using a perforation gun at different reservoir levels to produce holed sections through the casing, cement, and sides of the wellbore (120). Hydrocarbons may then enter the well stream through these holed sections. In some embodiments, perforation operations are performed using discharging jets or shaped explosive charges to penetrate the casing around the wellbore (120).

In one well completion example, the sides of the wellbore (120) may require support, and thus casing may be inserted into the wellbore (120) to provide such support. After a well has been drilled, casing may ensure that the wellbore (120) does not close in upon itself, while also protecting the well stream from outside incumbents, like water or sand. Likewise, if the formation is firm, casing may include a solid string of steel pipe that is run on the well and will remain that way during the life of the well.

In another well completion, a gravel packing operation may further be performed using a gravel-packing slurry of appropriately sized pieces of coarse sand or gravel. As such, the gravel-packing slurry may be pumped into the wellbore (120) between a casing's slotted liner and the sides of the wellbore (120). The sand screen (110) and the gravel pack may filter sand and other debris that might have otherwise entered the well stream with hydrocarbons.

In another well operation example, a space between the casing and the untreated sides of the wellbore (120) may be cemented to hold a casing in place. This well operation may include pumping cement slurry into the wellbore (120) to displace existing drilling fluid and fill in this space between the casing and the untreated sides of the wellbore (120). Cement slurry may include a mixture of various additives and cement. After the cement slurry is left to harden, cement may seal the wellbore (120) from non-hydrocarbons that attempt to enter the well stream. In some embodiments, the cement slurry is forced through a lower end of the casing and into an annulus between the casing and a wall of the wellbore (120). More specifically, a cementing plug may be used for pushing the cement slurry from the casing. For example, the cementing plug may be a rubber plug used to separate cement slurry from other fluids, reducing contamination and maintaining predictable slurry performance. A displacement fluid, such as water, or an appropriately weighted drilling fluid, may be pumped into the casing above the cementing plug. This displacement fluid may be pressurized fluid that serves to urge the cementing plug downward through the casing to extrude the cement from the casing outlet and back up into the annulus.

In another well completion, a wellhead assembly may be installed on the wellhead of the wellbore (120). A wellhead assembly may be a production tree (also called a Christmas tree) that includes valves, gauges, and other components to provide surface control of subsurface conditions of a well.

In some embodiments, a wellbore (120) includes one or more casing centralizers. For example, a casing centralizer may be a mechanical device that secures casing at various locations in a wellbore to prevent casing from contacting the walls of the wellbore. Thus, casing centralization may produce a continuous annular clearance around casing such that cement may be used to completely seal the casing to walls of the wellbore. Without casing centralization, a cementing operation may experience mud channeling and poor zonal isolation. Examples of casing centralizers may include bow-spring centralizers, rigid centralizers, semi-rigid centralizers, and mold-on centralizers. In particular, bow springs may be slightly larger than a particular wellbore in order to provide complete centralization in vertical or slightly deviated wells. On the other hand, rigid centralizers may be manufactured from solid steel bar or cast iron with a fixed blade height in order to fit a specific casing or hole size. Rigid centralizers may perform well even in deviated wellbores regardless of any particular side forces. Semi-rigid centralizers may be made of double crested bows and operate as a hybrid centralizer that includes features of both bow-spring and rigid centralizers. The spring characteristic of the bow-spring centralizers may allow the semi-rigid centralizers to compress in order to be disposed in tight spots in a wellbore. Mold-on centralizers may have blades made of carbon fiber ceramic material that can be applied directly to a casing surface.

In some embodiments, well intervention operations may also be performed at a well site. For example, well intervention operations may include various operations carried out by one or more service entities for an oil or gas well during its productive life (e.g., fracking operations, CT, flow back, separator, pumping, wellhead and production tree maintenance, slickline, braded line, coiled tubing, snubbing, workover, subsea well intervention, etc.). For example, well intervention activities may be similar to well completion operations, well delivery operations, and/or drilling operations in order to modify the state of a well or well geometry. In some embodiments, well intervention operations are used to provide well diagnostics, and/or manage the production of the well. With respect to service entities, a service entity may be a company or other actor that performs one or more types of oil field services, such as well operations, at a well site. For example, one or more service entities may be responsible for performing a cementing operation in the wellbore (120) prior to delivering the well to a producing entity.

While FIG. 1 shows various configurations of hardware components and/or software components, other configurations may be used without departing from the scope of the disclosure. For example, various components in FIG. 1 may be combined to create a single component. As another example, the functionality performed by a single component may be performed by two or more components.

Figure 2:
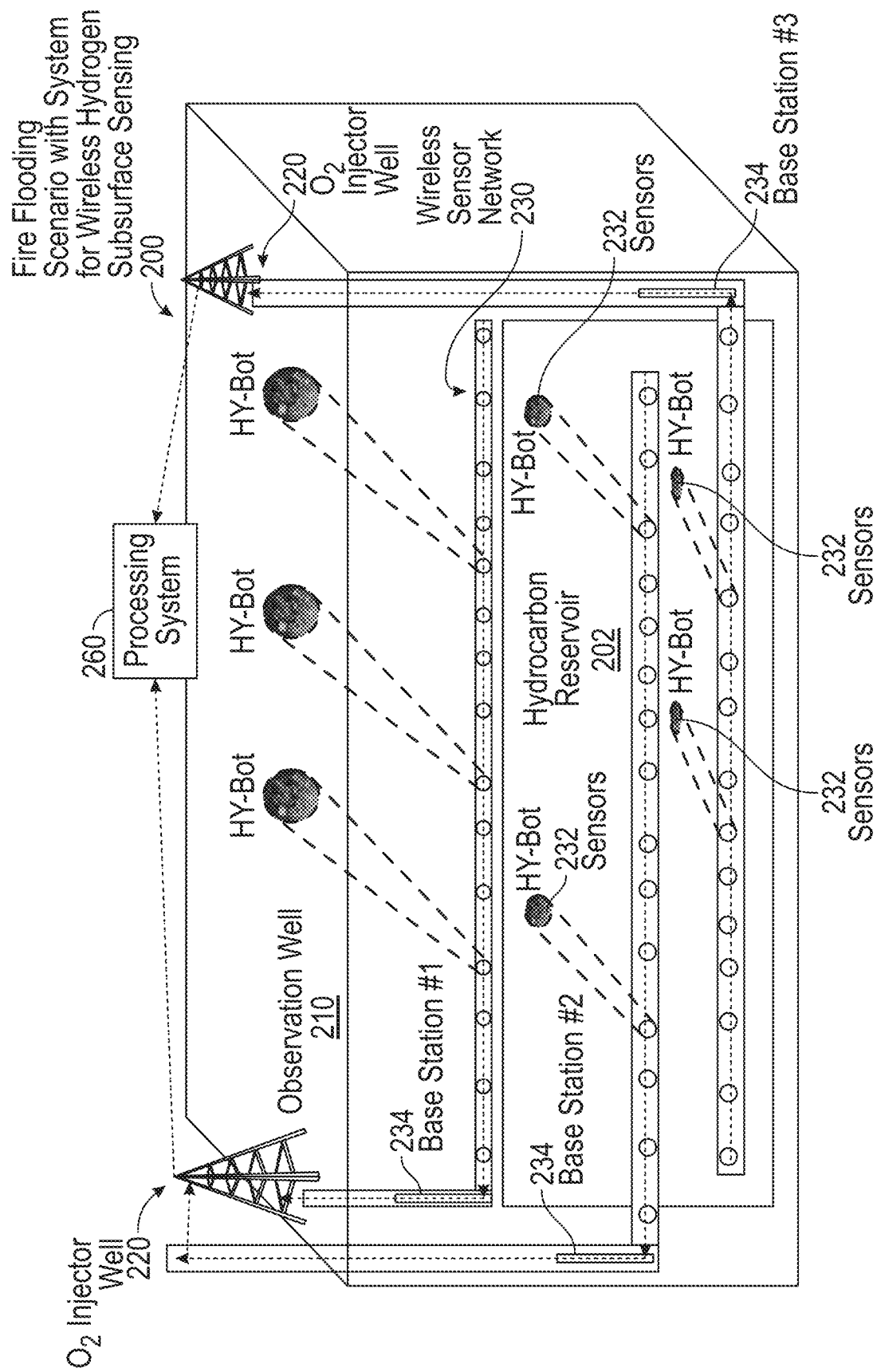
FIG. 2 shows an example of a fire flooding scenario with a system for wireless subsurface hydrogen sensing, in accordance with one or more embodiments.

Turning to FIG. 2, a fire flooding scenario (200) in accordance with one or more embodiments is shown. Fire flooding may be used to enhance hydrocarbon recovery from a reservoir (202). Air or oxygen may be injected into the hydrocarbon reservoir via $O_2$ injector wells (220). The mix of air/oxygen, hydrogen, and other gases in the reservoir (202) may be ignited and a burning zone may propagate through the reservoir from the injector wells (220) to the producing well(s) (not shown). The fireflood creates a bank of steam, gas from the combustion process, and evaporated hydrocarbons that drive the reservoir oil into the producing wells.

Embodiments of the disclosure provide a system for wireless hydrogen subsurface sensing in order to enhance recovery in fire flooded depleted reservoirs, including depleted gas reservoirs, heavy oil reservoirs and ultra-sour reservoirs. In one or more embodiments, subsurface sensors are used to measure in-situ in the reservoir and allow to accurately sense the presence of hydrogen. Reservoir monitoring operations may be improved and facilitated, using the sub-surface sensing.

The in-situ reservoir sensing, in one or more embodiments, is performed using a wireless sensor network (230) that provides data to a processing system (260) for further processing. The wireless sensor network includes sensors (232) for in-situ monitoring of the hydrogen movement inside the reservoir. A sufficiently large number of sensors (232) may be deployed inside the $O_2$ injector wellbores (220) and further in an observation wellbore (210) drilled above the seal of the hydrocarbon reservoir (202) to monitor the operational integrity and conditions in the hydrocarbon reservoir (202). The wireless sensor network further includes base stations (234) in each of the wells.

After the sensors (232) and the base stations (234) have been placed inside the wells, a sensor-to-sensor wireless connectivity may be established to communicate sensor data in multi-hop fashion between the sensors (232) until the sensor data reaches one of the base stations (234). The data collected by the sensors (232) of the wireless sensor network (230) may be transmitted to the processing system (260) for further processing, via the base stations (234) and aboveground gateways (not shown). These data may be used to monitor environmental variables such as hydrogen (or, more generally, chemical composition), pressure and temperature inside the reservoir (202). Collected pressure and temperature data may further be used to generate lateral profiles that may help in determining anomalies.

In one or more embodiments, a sensor (232) is equipped with various sensing modalities. For example, a sensor (232) may sense environmental temperature, pressure, chemistry (e.g., hydrogen), etc. A sensor (232) may include a microcontroller and a sensor interface to obtain sensing data. A sensor (232) may further include a near field communication (NFC) transceiver, e.g., a dual band NFC transceiver with active and passive interfaces. Other communication interfaces may be used, without departing from the disclosure.

In one or more embodiments, a sensor (232) harvests power from a base station (234) in the wellbore. A sensor (232) includes an energy management unit configured to operate using a protocol that enables the sensor (232) to harvest the energy radiated from the base station (234), temporarily store the energy, and use it when needed. A rechargeable battery and/or a super-capacitor may serve as a buffer.

A sensor (232) may facilitate generating location coordinates using a localization protocol. The sensor (232) may generate a received signal strength indicator (RSSI). The RSSI data may be sent to the base station (234). Subsequently, the RSSI data may be used to estimate the sensor's location.

Once a sensor (232) has been placed in the reservoir (202), the sensor (232) may establish node-to-node connectivity to generate and exchange data inside the reservoir (202) without human intervention. The sensor may thus begin to collect information such as temperature, pressure, chemical composition and other variables in the reservoir (202).

In one or more embodiments, a base station (234) includes an antenna, a signal processing unit, a microcontroller and an amplifier. A base station (234) may receive the communications from the sensors (232) in the borehole in a multi-hop configuration via Magnetic induction (MI) technique and may transmit the data and the commands to the sensors via electromagnetic waves (EM) technique. The base station may communicate with aboveground gateways using, for example, wired communication.

Figure 4:
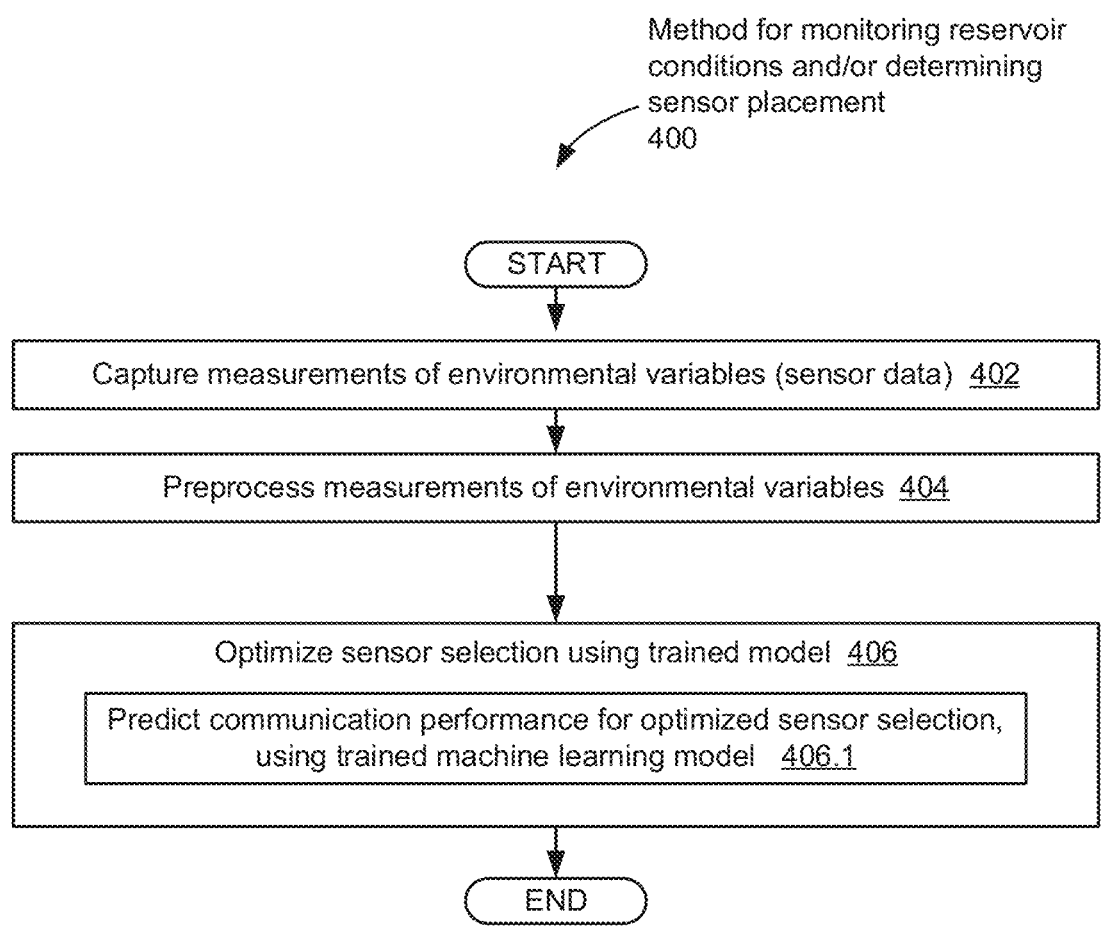
FIG. 4 shows a flowchart for a method in accordance with one or more embodiments.
Figure 5:
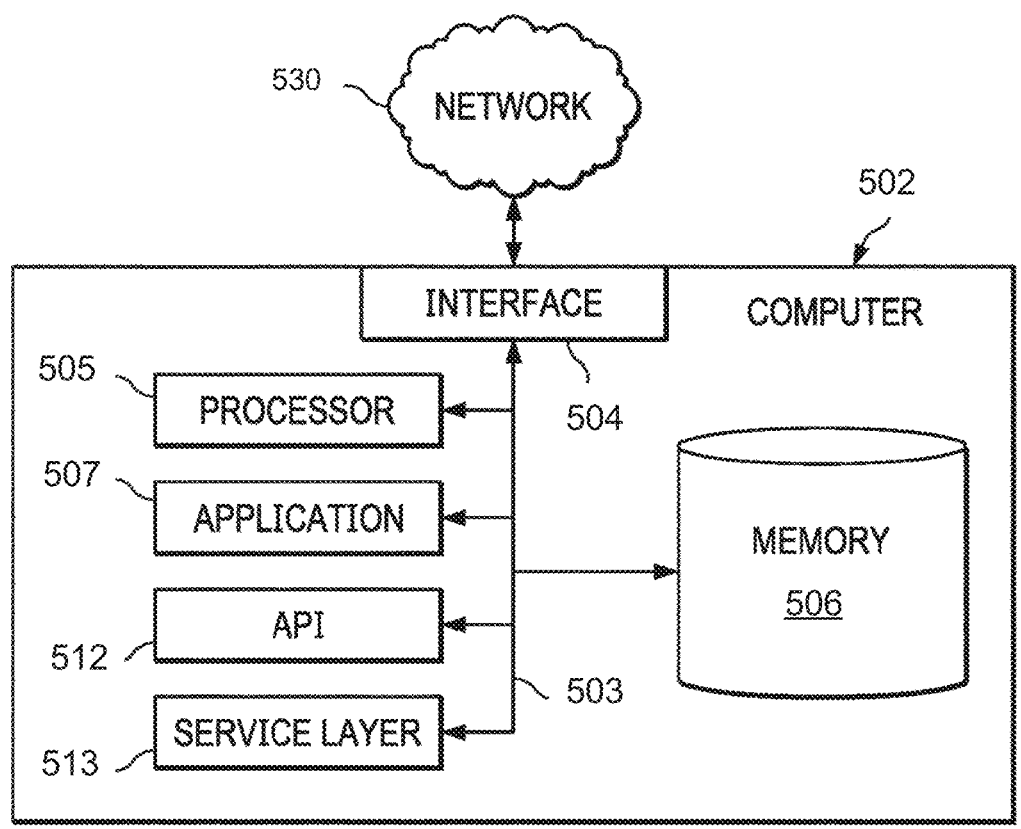
FIG. 5 shows a computer system in accordance with one or more embodiments.

In one or more embodiments, the processing system (260) is a computer system, e.g., as described in reference to FIG. 5. The processing system (260) may execute software instructions in the form of computer readable program code to perform the operations in accordance with embodiments may be stored, in whole or in part, temporarily or permanently, on a non-transitory computer readable medium. The software instructions may represent the methods described in reference to FIGS. 3 and 4.

In one or more embodiments, a machine learning framework is used to optimize the wireless sensor network (230). More specifically, the wireless sensor network (230) may be optimized to provide sufficient reservoir sensing coverage in order to enable the optimization of hydrogen recovery from fire flooding. The deployment of the sensors (232) may be optimized for the signal quality and transmission reliability of the sensors (232), in addition to the extent of power utilization. The machine learning framework, in one or more embodiments, efficiently and reliably relates the various impacting factors, such as temperature, distance, and overall operating environment to the signal and transmission quality, as well as the expected power utilization, unlike other conventional deterministic models. In one or more embodiments, the machine learning framework is integrated into a sensor selection optimization framework in order to optimize reservoir coverage while minimizing the number of sensors that are utilized at the same time. A minimum optimal number of sensors may, thus, be selected in real-time or near-real-time.

In one or more embodiments, the machine learning framework is based on a long short-term memory (LSTM) deep learning architecture. Other machine learning models may be used, without departing from the disclosure. After training the machine learning model, the machine learning model may be used to optimize the number of sensors to maximize coverage area or volume in the reservoir. A discussion of the training of the machine learning model and the use after integration into the sensor selection optimization framework is provided below in reference to the flowcharts of FIGS. 3 and 4.

While FIG. 2 shows a fire flooding scenario, the described sensor networks may also be used for other applications. For example, the sensor setup and framework may be also applied for hydrogen storage, $CO_2$ storage and gas reservoirs.

Figure 3:
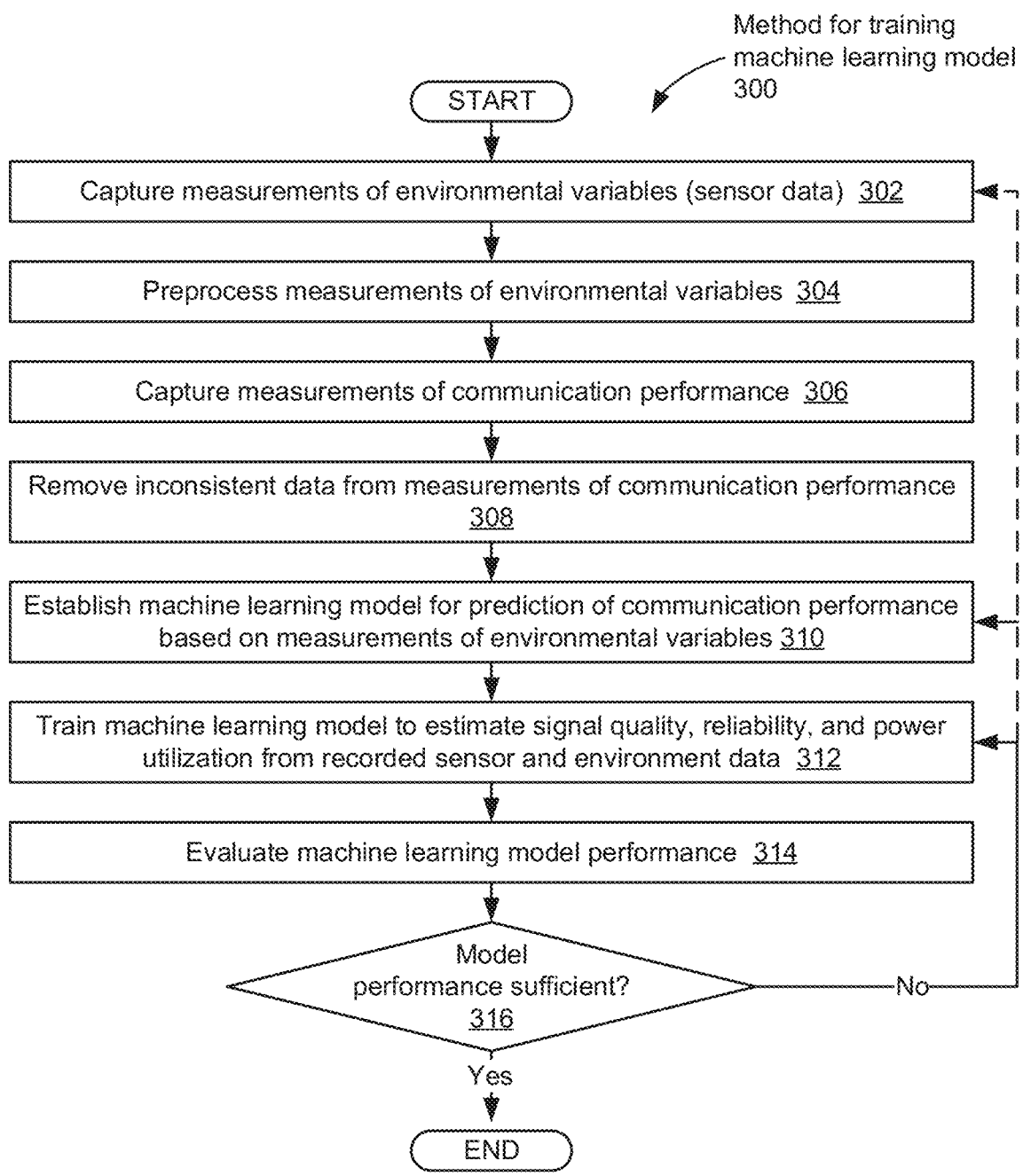
FIG. 3 shows a flowchart for a method in accordance with one or more embodiments.

FIGS. 3 and 4 show flowcharts in accordance with one or more embodiments. One or more blocks in FIG. 3 may be performed by one or more components (e.g., processing system (260) as described in FIG. 2). While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Turning to FIG. 3, a method (300) for training a machine learning model, in accordance with one or more embodiments, is shown.

In Step 302, measurements of environmental variables are captured by sensors of a wireless sensor network disposed in a reservoir as previously described in reference to FIG. 2. The environmental variables being measured may include hydrogen, pressure, and temperature. Measurements may be obtained from at least some or all sensors of the wireless sensor network. As an alternative to using subsurface data, lab data may be used. The sensors may further provide location information. Alternatively, sensor position may be known based on the original placement of the sensors.

In Step 304, the measurements of the environmental variables are preprocessed. Outliers in the measurements may be detected and removed. Moving windows and/or z-score techniques may be used for the outlier detection.

In Step 306, measurements of the communication performance of the sensors may be captured, in presence of the environmental conditions that are prevalent during the capturing of the environmental variables. The communication performance may be characterized based on signal quality, reliability of transmission, and power utilization. The signal quality may be monitored sensor-internally, e.g., by a wireless communication circuit of a sensor. The reliability of a transmission may be assessed based on transmission errors, re-transmissions, etc., and may also be determined sensor internally, e.g., by software executing on the sensor. Broadly speaking, the reliability of a transmission may be assessed based on the continuity at which data are transmitted and/or successfully received, as well as operational reliability of the sensors. Similarly, power utilization may also be monitored sensor-internally, e.g., by a power control module. The signal quality, reliability of transmission, and power utilization may be numerically characterized, e.g., in specified ranges such as 1-10, or any other ranges.

In Step 308, the measurements of the communication performance are analyzed and processed, e.g., to remove inconsistent data. Examples of inconsistent data include an extreme high signal quality that is very unlikely or unusually high power utilization which may indicate a failed power control module.

In Step 310, a machine learning model for prediction of the communication performance based on measurements of the environmental variables is established. Establishing the machine learning model may involve selecting a particular type of machine learning model.

In one embodiment, an LSTM deep network is selected to estimate signal quality, reliability and power utilization from the measurements of the environmental variables. An LSTM deep network may be selected due to its strong performance for network estimation problems that cover both time-series and single feature data, being able to integrate both of these data types efficiently. Any other type of machine learning model may be used without departing from the disclosure.

The machine learning model may be any type of machine learning model. Examples for machine learning models that may be used include, but are not limited to, perceptrons, convolutional neural networks, deep neural networks, recurrent neural networks, support vector machines, regression trees, random forests, extreme learning machines, type I and type II fuzzy logic (T1FL/T2FL), decision trees, inductive learning models, deductive learning models, supervised learning models, unsupervised learning models, reinforcement learning models, etc. In some embodiments, two or more different types of machine-learning models are integrated into a single machine-learning architecture, e.g., a machine-learning model may include support vector machines and neural networks.

With respect to neural networks, for example, a neural network may include one or more hidden layers, where a hidden layer includes one or more neurons. A neuron may be a modelling node or object that is loosely patterned on a neuron of the human brain. In particular, a neuron may combine data inputs with a set of coefficients, i.e., a set of network weights for adjusting the data inputs. These network weights may amplify or reduce the value of a particular data input, thereby assigning an amount of significance to various data inputs for a task being modeled. Through machine learning, a neural network may determine which data inputs should receive greater priority in determining one or more specified outputs of the neural network. Likewise, these weighted data inputs may be summed such that this sum is communicated through a neuron's activation function to other hidden layers within the neural network. As such, the activation function may determine whether and to what extent an output of a neuron progresses to other neurons where the output may be weighted again for use as an input to the next hidden layer.

Turning to recurrent neural networks, a recurrent neural network (RNN) may perform a particular task repeatedly for multiple data elements in an input sequence (e.g., a sequence of maintenance data or inspection data), with the output of the recurrent neural network being dependent on past computations (e.g., failure to perform maintenance or address an unsafe condition may produce one or more hazard incidents). As such, a recurrent neural network may operate with a memory or hidden cell state, which provides information for use by the current cell computation with respect to the current data input. For example, a recurrent neural network may resemble a chain-like structure of RNN cells, where different types of recurrent neural networks may have different types of repeating RNN cells. Likewise, the input sequence may be time-series data, where hidden cell states may have different values at different time steps during a prediction or training operation. For example, where a deep neural network may use different parameters at each hidden layer, a recurrent neural network may have common parameters in an RNN cell, which may be performed across multiple time steps. To train a recurrent neural network, a supervised learning algorithm such as a backpropagation algorithm may also be used. In some embodiments, the backpropagation algorithm is a backpropagation through time (BPTT) algorithm. Likewise, a BPTT algorithm may determine gradients to update various hidden layers and neurons within a recurrent neural network in a similar manner as used to train various deep neural networks. In some embodiments, a recurrent neural network is trained using a reinforcement learning algorithm such as a deep reinforcement learning algorithm. For more information on reinforcement learning algorithms, see the discussion below.

Embodiments are contemplated with different types of RNNs. For example, classic RNNs, long short-term memory (LSTM) networks, a gated recurrent unit (GRU), a stacked LSTM that includes multiple hidden LSTM layers (i.e., each LSTM layer includes multiple RNN cells), recurrent neural networks with attention (i.e., the machine-learning model may focus attention on specific elements in an input sequence), bidirectional recurrent neural networks (e.g., a machine-learning model that may be trained in both time directions simultaneously, with separate hidden layers, such as forward layers and backward layers), as well as multidimensional LSTM networks, graph recurrent neural networks, grid recurrent neural networks, etc., may be used. With regard to LSTM networks, an LSTM cell may include various output lines that carry vectors of information, e.g., from the output of one LSTM cell to the input of another LSTM cell. Thus, an LSTM cell may include multiple hidden layers as well as various pointwise operation units that perform computations such as vector addition.

In some embodiments, one or more ensemble learning methods may be used in connection to the machine-learning models. For example, an ensemble learning method may use multiple types of machine-learning models to obtain better predictive performance than available with a single machine-learning model. In some embodiments, for example, an ensemble architecture may combine multiple base models to produce a single machine-learning model. One example of an ensemble learning method is a BAGGing model (i.e., BAGGing refers to a model that performs Bootstrapping and Aggregation operations) that combines predictions from multiple neural networks to add a bias that reduces variance of a single trained neural network model. Another ensemble learning method includes a stacking method, which may involve fitting many different model types on the same data and using another machine-learning model to combine various predictions.

Establishing the machine learning model may further involve selecting the features to be considered by the machine learning model. For example, initially, data of all environmental variables may be considered by the neural network for training (Step 312). However, the neural network may later be retrained with a reduced number of features. Specifically, after execution of Step 314, discussed below, some features may be identified as less relevant in comparison to other features. Accordingly, the less relevant features may be excluded when retraining the machine learning model.

In one or more embodiments, expert information is incorporated into the machine learning model in order to optimize the data weighting in the network. Expert information may include, for example, user-provided information such as a user's detection of deteriorating sensor data. Data may be labeled accordingly, based on the detection of the deterioration.

In Step 312, the machine learning model is trained to estimate signal quality, reliability, and power utilization from environmental variables, for each of the sensors. The training is performed using the previously obtained measurements of the communication performance and the previously obtained measurements of the environmental variables as training data. Additional variables to be considered for the training may include the oxygen injection volume across the injecting wells, and/or produced volume of hydrogen across the producing wells. The location of the sensors may also be used. The training may be performed using a machine learning training algorithm.

Various types of machine learning training algorithms, e.g., backpropagation algorithms, may be used to train the machine learning model. In a backpropagation algorithm, gradients are computed for each hidden layer of a neural network in reverse from the layer closest to the output layer proceeding to the layer closest to the input layer. As such, a gradient may be calculated using the transpose of the weights of a respective hidden layer based on an error function (also called a "loss function"). The error function may be based on various criteria, such as mean squared error function, a similarity function, etc., where the error function may be used as a feedback mechanism for tuning weights in the machine-learning model.

Once trained, the output of the machine learning model is an estimate of communication performance of each of the sensors. Signal quality, reliability, and power utilization may be estimated based on inputs including measurements of the environmental variables in the reservoir (e.g., temperature, pressure, chemical composition). The inputs may further include values for oxygen injection volume across the injecting wells, and/or produced volume of hydrogen across the producing wells. Sensor locations may also be used as inputs. The signal quality may be quantified in a range, e.g., using a categorical variable between 0 and 10, where 0 represents very poor quality, and 10 represents optimal quality. The reliability of the sensor may be quantified in a range, e.g., using, a categorical variable between 1 and 5, where 1 represents poor reliability and 5 represents high reliability. Other scales may be used, without departing from the disclosure. Each of the environmental variables are estimated on a sensor level, i.e., for each sensor of the sensor network.

In Step 314, the performance of the machine learning model is evaluated. The evaluation may be performed by applying the trained machine learning model to a volume of test data. The resulting estimates of signal quality, reliability, and power utilization may be compared to actual values of signal quality, reliability, and power utilization in the test data. In one or more embodiments, evaluating the performance of the machine learning model further includes evaluating the feature set of the machine learning model. Each feature in the feature set may be analyzed on its impact on the estimate produced by the machine learning model. The impact may be assessed, for example, using Shapley values.

In Step 316, a decision is made regarding the sufficiency of the machine learning model accuracy. Whether the model performance is sufficient may be determined based on the degree of deviation of the resulting estimates from the actual values. If the deviation is acceptable, the execution of the method of FIG. 3 may terminate. If the deviation is unacceptable, a retraining of the machine learning model may be performed starting at Step 312. Alternatively, the machine learning model itself (e.g., its hyperparameters) may be updated, starting at Step 310. Alternatively, the retraining may be more comprehensive, and may involve the collection of new training data, starting at Step 302.

Turning to FIG. 4, a method (400) for monitoring reservoir conditions and/or determining sensor placement, in accordance with one or more embodiments, is shown. The method may be executed at any time, once the machine learning model has been trained using the method of FIG. 3. For example, the method of FIG. 4 may be initially executed to determine an initial sensor placement. Further, the method of FIG. 4 may be periodically executed to provide real-time feedback on sensor placement, e.g., to detect suboptimal sensor placement as environmental conditions are changing in the reservoir.

In Step 402, measurements of environmental variables are captured by sensors of a wireless sensor network, analogous to the acquisition of measurements in Step 302 of FIG. 3.

In Step 404, the measurements of the environmental variables are preprocessed, analogous to the preprocessing in Step 402 of FIG. 3.

Steps 402 and 404 may be performed at regular intervals, and the reservoir conditions may be continuously assessed by monitoring the environmental variables for changes.

A detected change may trigger the execution of Step 406. Alternatively, Step 406 may also be executed with no change having been detected.

In Step 406, a sensor selection used for monitoring the reservoir is optimized. The sensor selection may be performed using a mixed-integer optimization framework that minimizes, in each step, the number of active sensors, taking into account the sensors' power levels. The mixed-integer optimization framework is constrained by ensuring that the reservoir is sufficiently covered (e.g., full coverage of the entire reservoir or a region of interest in the reservoir, e.g., based on production considerations), and that sensors covering the reservoir have sufficient signal quality to perform robustly. Throughout the optimization, estimates of communication performance, predicted using the trained machine learning model are relied upon (Step 406.1), as sensors are systematically dropped from consideration. Eventually, a sensor selection may be determined, for which the number of active sensors is minimized, while still providing coverage of all areas of the reservoir by at least one sensor. In other words, the cardinality of the set of sensors to be actively used for the monitoring of the reservoir is minimized. While the full set of sensor present in the reservoir may be large, a much smaller subset may turn out to be sufficient for a complete monitoring of the reservoir, if the subset is carefully selected. To further constrain the optimization, a reliability of no less than 50%, and a signal quality above 70% of the best possible signal may be specified. Another constraint may involve avoiding sensors with high power consumption and/or low battery state. While the assumption may be that, during the current optimization cycle, no sensors are added and/or relocated, depending on the outcome of the sensor selection, additional sensors may eventually be added to the reservoir, as needed. Sensors that are malfunctioning may be disregarded and may be removed.

Embodiments may be implemented on a computer system. FIG. 5 is a block diagram of a computer system (502) used to provide computational functionalities associated with described algorithms, methods, functions, processes, flows, and procedures as described in the instant disclosure, according to an implementation. The illustrated computer (502) is intended to encompass any computing device such as a high-performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (502) may include a computer that includes an input device, such as a keypad, keyboard, touch screen, or other device that can accept user information, and an output device that conveys information associated with the operation of the computer (502), including digital data, visual, or audio information (or a combination of information), or a GUI.

The computer (502) can serve in a role as a client, network component, a server, a database or other persistency, or any other component (or a combination of roles) of a computer system for performing the subject matter described in the instant disclosure. The illustrated computer (502) is communicably coupled with a network (530). In some implementations, one or more components of the computer (502) may be configured to operate within environments, including cloud-computing-based, local, global, or other environment (or a combination of environments).

At a high level, the computer (502) is an electronic computing device operable to receive, transmit, process, store, or manage data and information associated with the described subject matter. According to some implementations, the computer (502) may also include or be communicably coupled with an application server, e-mail server, web server, caching server, streaming data server, business intelligence (BI) server, or other server (or a combination of servers).

The computer (502) can receive requests over network (530) from a client application (for example, executing on another computer (502)) and responding to the received requests by processing the said requests in an appropriate software application. In addition, requests may also be sent to the computer (502) from internal users (for example, from a command console or by other appropriate access method), external or third-parties, other automated applications, as well as any other appropriate entities, individuals, systems, or computers.

Each of the components of the computer (502) can communicate using a system bus (503). In some implementations, any or all of the components of the computer (502), both hardware or software (or a combination of hardware and software), may interface with each other or the interface (504) (or a combination of both) over the system bus (503) using an application programming interface (API) (512) or a service layer (513) (or a combination of the API (512) and service layer (513). The API (512) may include specifications for routines, data structures, and object classes. The API (512) may be either computer-language independent or dependent and refer to a complete interface, a single function, or even a set of APIs. The service layer (513) provides software services to the computer (502) or other components (whether or not illustrated) that are communicably coupled to the computer (502). The functionality of the computer (502) may be accessible for all service consumers using this service layer. Software services, such as those provided by the service layer (513), provide reusable, defined business functionalities through a defined interface. For example, the interface may be software written in JAVA, C++, or other suitable language providing data in extensible markup language (XML) format or other suitable format. While illustrated as an integrated component of the computer (502), alternative implementations may illustrate the API (512) or the service layer (513) as stand-alone components in relation to other components of the computer (502) or other components (whether or not illustrated) that are communicably coupled to the computer (502). Moreover, any or all parts of the API (512) or the service layer (513) may be implemented as child or sub-modules of another software module, enterprise application, or hardware module without departing from the scope of this disclosure.

The computer (502) includes an interface (504). Although illustrated as a single interface (504) in FIG. 5, two or more interfaces (504) may be used according to particular needs, desires, or particular implementations of the computer (502). The interface (504) is used by the computer (502) for communicating with other systems in a distributed environment that are connected to the network (530). Generally, the interface (504 includes logic encoded in software or hardware (or a combination of software and hardware) and operable to communicate with the network (530). More specifically, the interface (504) may include software supporting one or more communication protocols associated with communications such that the network (530) or interface's hardware is operable to communicate physical signals within and outside of the illustrated computer (502).

The computer (502) includes at least one computer processor (505). Although illustrated as a single computer processor (505) in FIG. 5, two or more processors may be used according to particular needs, desires, or particular implementations of the computer (502). Generally, the computer processor (505) executes instructions and manipulates data to perform the operations of the computer (502) and any algorithms, methods, functions, processes, flows, and procedures as described in the instant disclosure.

The computer (502) also includes a memory (506) that holds data for the computer (502) or other components (or a combination of both) that can be connected to the network (530). For example, memory (506) can be a database storing data consistent with this disclosure. Although illustrated as a single memory (506) in FIG. 5, two or more memories may be used according to particular needs, desires, or particular implementations of the computer (502) and the described functionality. While memory (506) is illustrated as an integral component of the computer (502), in alternative implementations, memory (506) can be external to the computer (502).

The application (507) is an algorithmic software engine providing functionality according to particular needs, desires, or particular implementations of the computer (502), particularly with respect to functionality described in this disclosure. For example, application (507) can serve as one or more components, modules, applications, etc. Further, although illustrated as a single application (507), the application (507) may be implemented as multiple applications (507) on the computer (502). In addition, although illustrated as integral to the computer (502), in alternative implementations, the application (507) can be external to the computer (502).

There may be any number of computers (502) associated with, or external to, a computer system containing computer (502), each computer (502) communicating over network (530). Further, the term "client," "user," and other appropriate terminology may be used interchangeably as appropriate without departing from the scope of this disclosure. Moreover, this disclosure contemplates that many users may use one computer (502), or that one user may use multiple computers (502).

In some embodiments, the computer (502) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, a cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method for optimizing a wireless sensor network for monitoring hydrogen production from fire flooding in a sub-surface reservoir,
   the wireless sensor network comprising a plurality of sensors,
      wherein each sensor of the plurality of sensors is configured to locally sense environmental conditions in the reservoir,
      wherein the plurality of sensors provide a sensing coverage of the environmental conditions for at least a region of the reservoir, and
      wherein the plurality of sensors is configured to communicate the locally sensed environmental condition via the plurality of sensors in multi-hop fashion to a base station;
   the method comprising:
      obtaining, from each sensor, a first measurement of the environmental conditions;
      obtaining, from each sensor, a first measurement of a communication performance in presence of the environmental conditions that are prevalent during the measurement of the environmental conditions;
      training a machine learning model to generate an estimate of the communication performance of each sensor of the plurality of sensors based on the first measurement of the environmental conditions and the first measurement of the communication performance obtained for the plurality of sensors;
      determining a subset of the plurality of sensors by removing at least one sensor from the plurality of sensors without compromising the sensing coverage of the environmental conditions;
      obtaining from each sensor of the subset of the plurality of sensors, a second measurement of the environmental conditions;
      predicting, by the trained machine learning model operating on the second measurement, a predicted communication performance of the subset of the plurality of sensors;
      determining that the predicted communication performance is sufficient to communicate the second measurement to the base station; and
      monitoring the environmental conditions in the reservoir using only the subset of the plurality of sensors, based on the determination that the predicted communication performance is sufficient.

2. The method of claim 1, wherein the environmental conditions comprise at least one selected from a group consisting of temperature, pressure, and chemical composition.

3. The method of claim 1, wherein the communication performance comprises at least one selected from a group consisting of signal quality, reliability, and power utilization.

4. The method of claim 1, wherein the predicting of the predicted communication performance is performed under consideration of constraints comprising:
   at least a minimum signal quality,
   at least a minimum reliability,
   avoidance of sensors with high power consumption, and
   avoidance of sensors with low battery state.

5. The method of claim 1, wherein the optimizing of the wireless sensor network is performed using a mixed-integer optimization based on the estimate of the communication performance.

6. The method of claim 1, wherein training the machine learning model comprises:
   generating training data comprising the first measurement of the environmental conditions of each sensor as input and the first measurement of the communication performance of each sensor as output; and
   training the machine learning model using the training data.

7. The method of claim 6, wherein generating the training data comprises:
   preprocessing the first measurement of the environmental conditions of each sensor to remove outliers.

8. The method of claim 6, wherein generating the training data comprises:
   removing inconsistent data from the first measurement of the communication performance of each sensor.

9. The method of claim 6, wherein training the machine learning model further comprises:
   evaluating the machine learning model; and retraining the machine learning model when performance is considered insufficient, based on the evaluation of the machine learning model.

10. The method of claim 1, wherein the machine learning model is a long short-term memory (LSTM) model.

11. A system for monitoring hydrogen production from fire flooding in a sub-surface reservoir, the system comprising:
a wireless sensor network comprising:
a plurality of sensors;
a base station:
wherein each sensor of the plurality of sensors is configured to locally sense environmental conditions in the reservoir,
wherein the plurality of sensors provide a sensing coverage of the environmental conditions for at least a region of the reservoir,
wherein the plurality of sensors is configured to communicate the locally sensed environmental condition via the plurality of sensors in multi-hop fashion to a base station;
wherein the base station is configured to wirelessly receive the locally sensed environmental condition, and forward the locally sensed environmental condition to an aboveground gateway; and
a processing system configured to:
obtain, from each sensor via the aboveground gateway, a first measurement of the environmental conditions;
obtain, from each sensor via the aboveground gateway, a first measurement of a communication performance in presence of the environmental conditions that are prevalent during the measurement of the environmental conditions;
train a machine learning model to generate an estimate of the communication performance of each sensor of the plurality of sensors-based on the first measurement of the environmental conditions and the first measurement of the communication performance obtained for the plurality of sensors;
determine a subset of the plurality of sensors by removing at least one sensor from the plurality of sensors without compromising the sensing coverage of the environmental conditions;
obtain, from each sensor of the subset of the plurality of sensors via the aboveground gateway, a second measurement of the environmental conditions;
predict, by the trained machine learning model operating on the second measurement, a predicted communication performance of the subset of the plurality of sensors;
determine that the predicted communication performance is sufficient to communicate the second measurement to the base station; and
monitor the environmental conditions in the reservoir using only the subset of the plurality of sensors, based on the determination that the predicted communication performance is sufficient.

12. The system of claim 11, wherein the sensors are disposed in at least one selected from a group consisting of: an observation well above a seal of a hydrogen target injection zone, and $O_2$ injector wellbores.

13. The system of claim 11, wherein the determining of the subset of the plurality of sensors comprises a mixed-integer optimization based on the predicted communication performance.

14. The system of claim 11, wherein the communication performance comprises at least one selected from a group consisting of signal quality, reliability, and power utilization.

15. The system of claim 11, wherein the environmental conditions comprise at least one selected from a group consisting of temperature, pressure, and chemical composition.

16. A non-transitory machine-readable medium comprising a plurality of machine-readable instructions executed by one or more processors, the plurality of machine-readable instructions causing the one or more processors to perform operations that optimize a wireless sensor network for monitoring hydrogen production from fire flooding in a sub-surface reservoir,
the wireless sensor network comprising a plurality of sensors,
wherein each sensor of the plurality of sensors is configured to locally sense environmental conditions in the reservoir,
wherein the plurality of sensors provide a sensing coverage of the environmental conditions for at least a region of the reservoir, and
wherein the plurality of sensors is configured to communicate the locally sensed environmental condition via the plurality of sensors in multi-hop fashion to a base station;
the operations comprising:
obtaining, from each sensor, a first measurement of the environmental conditions;
obtaining, from each sensor, a first measurement of a communication performance in presence of the environmental conditions that are prevalent during the measurement of the environmental conditions;
training a machine learning model to generate an estimate of the communication performance of each sensor of the plurality of sensors based on the first measurement of the environmental conditions and the first measurement of the communication performance obtained for the plurality of sensors;
determining a subset of the plurality of sensors by removing at least one sensor from the plurality of sensors without compromising the sensing coverage of the environmental conditions;
obtaining, from each sensor of the subset of the plurality of sensors, a second measurement of the environmental conditions;
predicting, by the trained machine learning model operating on the second measurement, a predicted communication performance of the subset of the plurality of sensors;
determining that the predicted communication performance is sufficient to communicate the second measurement to the base station; and
monitoring the environmental conditions in the reservoir using only the subset of the plurality of sensors, based on the determination that the predicted communication performance is sufficient.

17. The non-transitory machine-readable medium of claim 16, wherein the the optimizing of the wireless sensor network is performed using a mixed-integer optimization based on the estimate of the communication performance.

* * * * *